United States Patent Office 2,709,576
Patented May 31, 1955

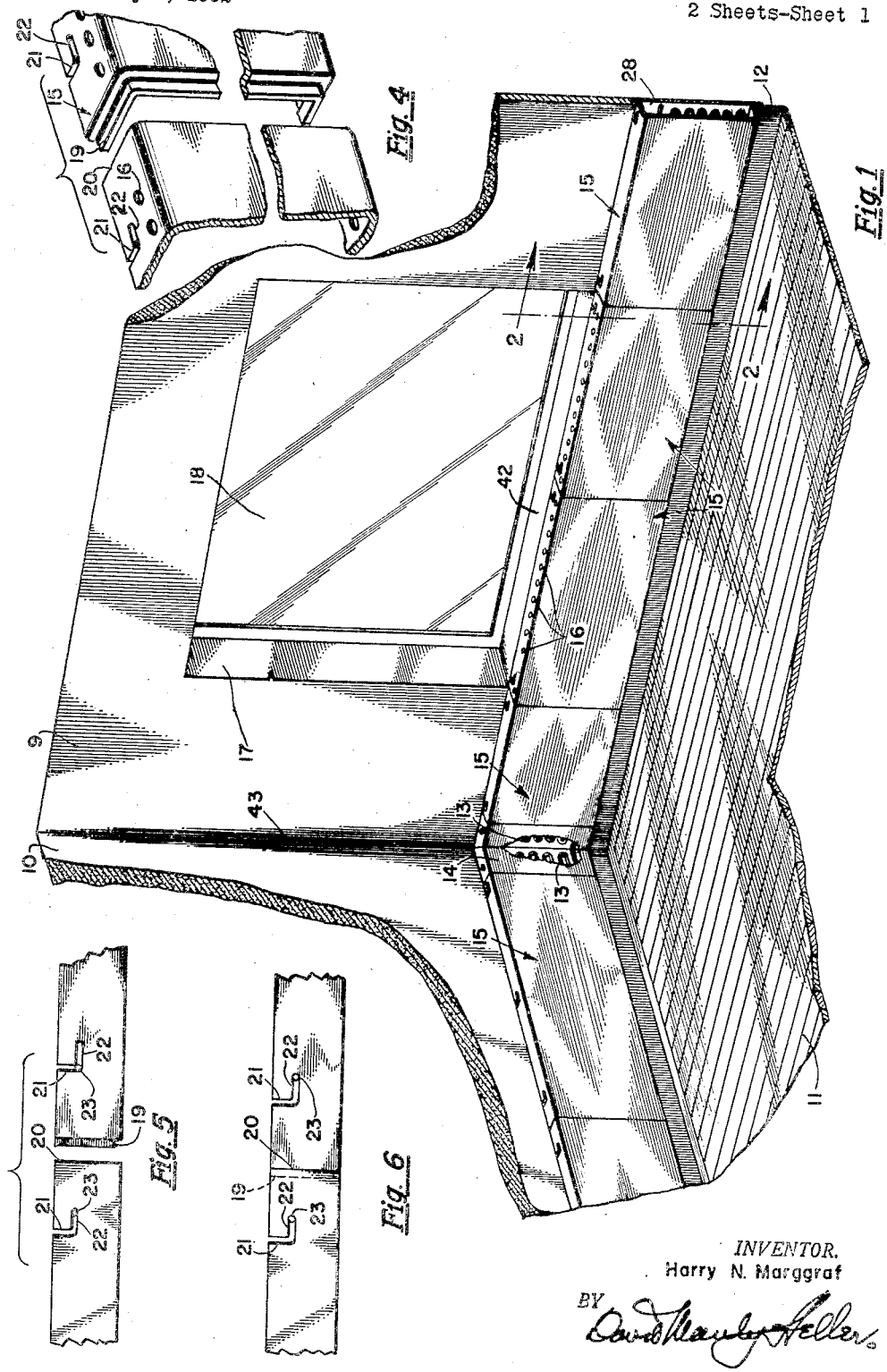

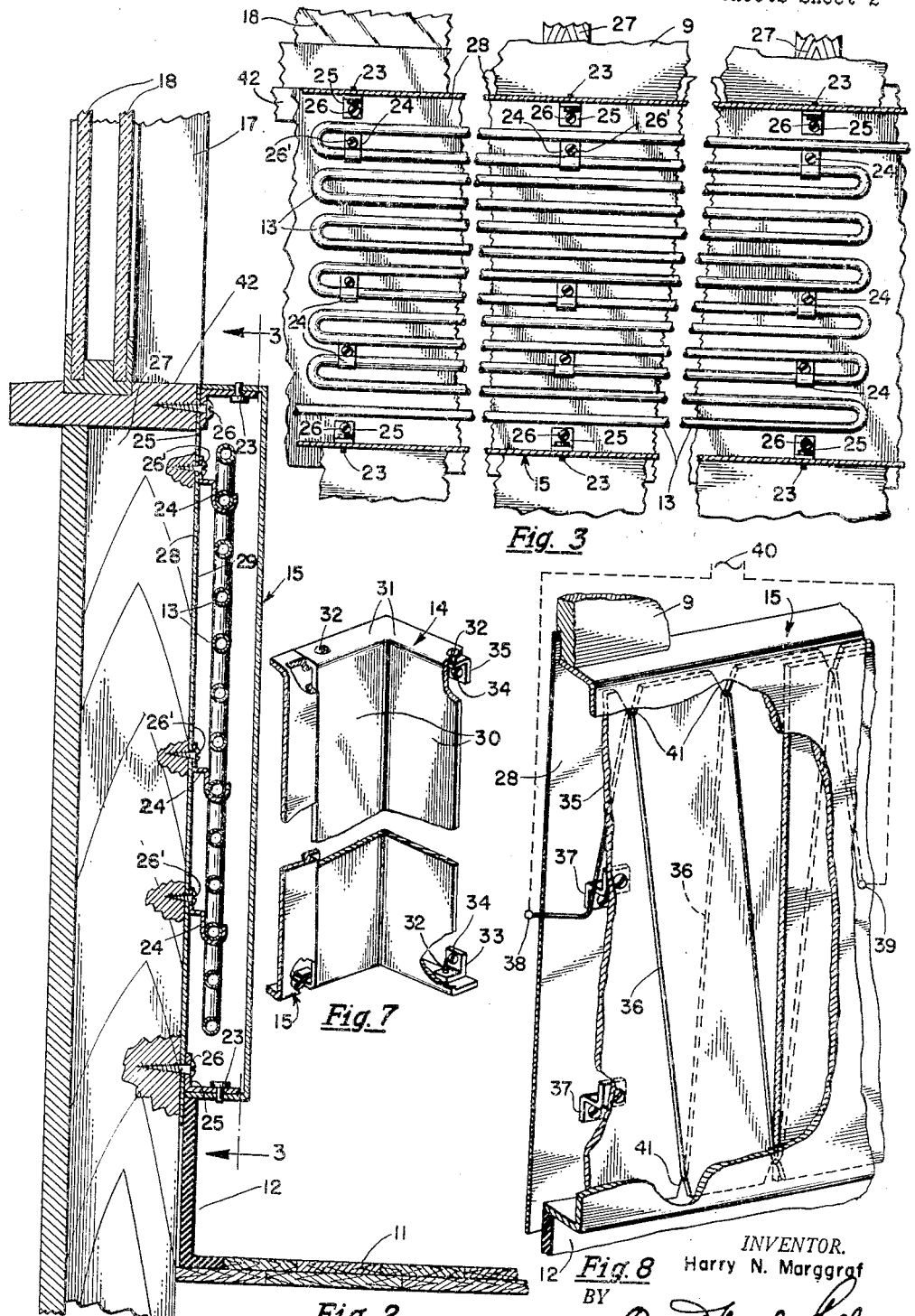

2,709,576

CASING STRUCTURE FOR BASEBOARD HEATERS

Harry N. Marggraf, Chicago, Ill.

Application May 5, 1952, Serial No. 286,155

2 Claims. (Cl. 257—133)

My invention relates to streamlined heating means to be used interiorly in buildings.

An important object of my invention is to provide a wainscot type of heating construction which is made up of a number of units nesting in end to end relationship so that the same may be readily removed for accessibility to the heating units for enclosing heating coils for conveying a fluid heating medium or for concealing electrical heating means of conventional construction.

Another object of my invention is to provide a streamlined enclosure for heating means which will make it possible to simplify window structures, the heating enclosure furnishing a sill-like finish or ledge to the bottom portion of the window.

A still further object of my invention is to provide heating enclosure means of the aforementioned character, fluid conveying heat conduits made of a relatively thin walled copper tubing constructed in sinuous formation so that many more coils can be confined within a given area than if standard pipe conduits were employed.

A still further object of my invention is to provide heating means consisting of mica or insulation means having notched means therein, so as to anchor suitably in angularly and in helical formation Nichrome wire heating means, or other similar heating elements which are connected to an electrical source of supply.

Other objects, advantages and features inherent in my invention will become apparent from an examination of the accompanying drawings, reference being had to the ensuing description, wherein like numerals designate like parts, and in which:

Fig. 1 is a fragmentary perspective view of a corner of a room showing my invention located therein in its proper relationship.

Fig. 2 is a cross-sectional view taken, substantially, on the lines 2—2 of Fig. 1.

Fig. 3 is a cross-sectional view taken, substantially, on the lines 3—3 of Fig. 2.

Fig. 4 is a perspective view with portions thereof broken away in order to more clearly illustrate the nesting means for the inter-relationship and connection of an to end assembly of the various heat enclosure means comprising my invention.

Fig. 5 is a view indicating the means enabling the instant attachment or detachment of units and is more or less of bayonet-lock formation; the view depicting position preparatory to attachment.

Fig. 6 is a view similar to Fig. 5 showing attachment of units.

Fig. 7 is an important element of my invention consisting of a dihedrally angular formation which is an adapter for the corners of room structures.

Fig. 8 is a slight modification of my invention showing the heat enclosure means utilized in connection with an electrical heating system, as distinguished from the fluid conduit system illustrated in Figs. 2 and 3 which represent either hot air, steam heat, or hot water.

Referring to the various views, the walls of a room 9 and 10 define a corner of that room showing the application of the structures comprising my invention, and designated primarily 15 and 14 for the dihedral corner element means.

The coils 13 are made of copper and have approximately a $\frac{1}{32}''$ wall which will facilitate their being bent to sinuous formation as indicated in Fig. 3, so that the same may be conveniently supported by brackets 24 and 25 which are secured to the studding 27 by screws 26 and 26'.

The window frame 17 is brought down and assembled on the wall 9 in order to enclose the picture window 18, the same being brought down so that the bottom ledge thereof designated 42 will be in alignment with the top surface of the heat enclosure means 15, the same also being suitably drilled or bored at 16 to permit the heat currents and heat waves to be radiated upwardly.

The illustration in Fig. 4 shows how the elements 15 are secured in butted relationship, namely, one end of the element 15 and a reduced shoulder 19 formed thereon, so as to nest within the straight surface on the opposite end 20 of another like element; the depth of the shoulder 19 being equivalent to the thickness of the metal employed for the construction of units 15 so that a smooth, uninterrupted streamlined surface will result when they are assembled in end to end relationship.

The assembly is made possible by the studs 23 secured to the brackets 25 which engage the bayonet slots 21 and 22 so that the elements 15 must be first pushed toward the wall so that element 23 will fit into the slotted portions 21 and then they are moved to the left looking at Fig. 4 so as to permit the angularly formed portion 22 of the slot, to engage the pin 23, thus forming a rigid assembly.

In corners of the room, a dihedrally formed element 14 will be necessary; Fig. 7 illustrates that the said element consists of the dihedral surfaces 30, having right angular flange formations 31 at the top and bottom so that the same will engage the recessed formation or a shoulder formation on the elements 15 and the brackets 33 and 35 at the top and bottom, which are secured to the studding by screws 34 will furnish a holding means for the screws 32 so that the elements 14 may be coincidently fixed with respect to the corner of a room 43.

The thinness of wall utilized in the pipe coils 13 will facilitate the sinuous formation thereof, and will also permit a more compact heating unit which would not be possible if standard pipe sizes were employed.

The heating means illustrated in the modification of Fig. 8 consists of a sheet of mica or other similar heat insulating material designated 35 having notched formations 41 so as to permit the winding of the Nichrome or other heating means 36 helically thereabout, so that the electric terminals 39 and 38 may be connected to a suitable source of electrical energy 40.

The mica or insulator element 35 may be secured to the studding 27 of the wall by means of brackets 37 and screws or similar fastenings as indicated.

Thus it will be seen that this unit will furnish electrical heating means, and the cover enclosures comprising my invention and designated and composed of the elements 15 and the corner angular elements 14, will serve to streamline the heating means, the same being raised above the floor 11 so as to furnish toe room 12 whenever it is desired to work or approach close to the walls 9, 10 or any wall of the room, or when it is necessary to work in the vicinity to make repairs or replacements.

The ledge 42, blending in with the top surface of the elements 15 and the same being bored as indicated at 16 in order to furnish means for radiation so that the heat currents can reverberate through the room and provide the necessary heating facilities.

From an architectural standpoint, the streamlining of the heating means presented herein is considered an advantage in that it blends in with the walls 9 and 10 of a room and especially in view of the fact that it is of wainscot height so that the same can be narrower; the heating will be provided insofar as the coil 13 is concerned, by steam, hot water, hot air, or any other fluid means of heating, or by the electrical means indicated in Fig. 8.

Another feature of my invention might be pointed out in the aluminum plate 28 employed rearwardly of the unit 15 to form a complete enclosure so that the polished surface 29 thereof will act as a reflecting means tending to prevent radiation of the heat currents out of the room, and thus confine all the heat intensifying it inwardly into the room.

The heat enclosures 15 and 14 may, from a decorative standpoint, be painted so that they blend in with the walls 9 and 10 in complementary colors therewith, or made up of simulated wood grain, or wood paneling, or any other form of interior decoration suitable for the particular room involved.

While I have illustrated and described what I now regard as the preferred form of construction, it is to be understood that I expressly reserve the right to make all such changes or modifications as may fairly fall within the scope of the appended claims.

Having thus disclosed and revealed my invention, what I claim as new and desire to secure by Letters Patent is:

1. Streamlined radiant heating enclosure means adapted to be secured perimetrically and interiorly to walls of a room and in intimate contact therewith defining perimetrically disposed toe room and being of wainscot height the top portions thereof forming window ledges for window openings in said walls, said streamlined radiant heating enclosure means being made up of a plurality of sections, each section being of C-shaped configuration longitudinally each including a top wall and imperforate bottom and front walls and provided with open ends, the top walls of sections adjacent windows being apertured to permit heated air currents to permeate the areas adjacent said windows, an edge of one of said ends having a reduced shoulder to fit in nesting relationship with the normal edge of an adjacent section to form a continuous streamlined arrangement perimetrically, dihedrally formed corner elements having securing flanges and adapted to be disposed in congruent relationship with corners of said room, bracket means secured to studding within said walls, stud means securing said streamlined radiant heating enclosure means to said bracket means, and right-angularly formed bayonet lock means on said top wall of said sections adapted to removably secure each of said sections to adjacent sections and to said stud means.

2. Streamlined radiant heating enclosure means adapted to be secured perimetrically and interiorly to walls of a room and in intimate contact therewith and being of wainscot height the top portions thereof forming window ledges for window openings in said walls, said streamlined radiant heating enclosure means being made up of a plurality of sections, each section being of C-shaped configuration longitudinally each including a top wall and imperforate bottom and front walls and provided with open ends, the top walls of sections adjacent windows being apertured to permit heated air currents to permeate the areas adjacent said windows, an edge of one of said ends having a reduced shoulder to fit in nesting relationship with the normal edge of an adjacent section to form a continuous streamlined arrangement perimetrically, dihedrally formed corner elements having securing flanges and adapted to be disposed in congruent relationship with corners of said room, bracket means secured to studding within said walls, stud means securing said streamlined radiant heating enclosure means to said bracket means, and right-angularly formed bayonet lock means on said top walls of said sections adapted to removably secure each of said sections to adjacent sections and to said stud means.

References Cited in the file of this patent

UNITED STATES PATENTS

| | | |
|---|---|---|
| 1,914,196 | Davis, Jr., et al. | June 13, 1933 |
| 2,018,236 | Space | Oct. 22, 1935 |
| 2,269,578 | Buti | Jan. 13, 1942 |
| 2,487,287 | Weber et al. | Nov. 8, 1949 |
| 2,516,871 | Haugen | Aug. 1, 1950 |
| 2,568,818 | O'Day | Sept. 25, 1951 |
| 2,651,504 | Gundrum et al. | Sept. 8, 1953 |